United States Patent [19]
Junkin

[11] Patent Number: 6,108,271
[45] Date of Patent: Aug. 22, 2000

[54] REMOTE CONTROL DEVICE FOR CONTROLLING ELECTRONIC DEVICES

[75] Inventor: William F. Junkin, Due West, S.C.

[73] Assignee: Erskine College, Due West, S.C.

[21] Appl. No.: 09/209,129

[22] Filed: Dec. 10, 1998

[51] Int. Cl.[7] ........................................... G01S 3/808
[52] U.S. Cl. ..................... 367/127; 367/907; 345/148
[58] Field of Search .................................... 367/124, 127, 367/907; 345/148

[56] References Cited

U.S. PATENT DOCUMENTS

| | | |
|---|---|---|
| 3,924,450 | 12/1975 | Uchiyama et al. . |
| 4,414,537 | 11/1983 | Grimes . |
| 4,464,652 | 8/1984 | Lapson et al. . |
| 4,506,354 | 3/1985 | Hansen . |
| 4,682,159 | 7/1987 | Davison ................................. 345/148 |
| 4,711,543 | 12/1987 | Blair et al. . |
| 4,758,691 | 7/1988 | De Bruyne . |
| 4,814,552 | 3/1989 | Stefik et al. . |
| 4,862,152 | 8/1989 | Milner . |
| 4,885,433 | 12/1989 | Schier . |
| 4,988,981 | 1/1991 | Zimmerman et al. . |
| 5,073,685 | 12/1991 | Kobayashi et al. ...................... 367/907 |
| 5,126,513 | 6/1992 | Wang et al. . |
| 5,142,506 | 8/1992 | Edwards . |
| 5,214,615 | 5/1993 | Bauer . |
| 5,239,139 | 8/1993 | Zuta . |
| 5,247,487 | 9/1993 | Beliveau et al. . |
| 5,418,712 | 5/1995 | Miwa et al. . |
| 5,594,469 | 1/1997 | Freeman et al. . |
| 5,892,501 | 4/1999 | Kim et al. ................................ 345/158 |

*Primary Examiner*—Ian J. Lobo
*Attorney, Agent, or Firm*—Nelson Mullins Riley & Scarborough

[57] ABSTRACT

The present invention is generally directed to a method of remotely controlling electronic devices by using the change in time required for sound waves to travel from an emitter to a detector. The time needed for emitted sound waves to reach a detector depends on the distance from the emitter to the detector. The present invention uses a system which measures the time between emission and detection of two or more successive sound pulses or sound waves. The change in time for sound waves to travel the distance from the emitter (or emitters) to the detector (or detectors) is determined and then used for controlling electronic devices. The sound waves are produced by a sound generator, and the detector is designed specifically for the detection of sound waves. In certain embodiments, ultrasonic sound waves or pulses are produced by the sound generator and are used to control an electronic device such as a computer cursor or vehicle.

20 Claims, 1 Drawing Sheet

REMOTE CONTROL DEVICE FOR CONTROLLING ELECTRONIC DEVICES

FIELD OF THE INVENTION

The present invention generally relates to the control of electronic devices using a sound emitter and a sound detector. The change in time for sound waves to travel the distance from an emitter to a detector or detectors is determined and then used for controlling electronic devices. The sound waves are produced by a sound generator, and the detector is designed specifically for the detection of sound waves. This device-controlling technique may be applied to control a computer, yet it has many other varied applications.

BACKGROUND AND PROBLEMS TO BE SOLVED BY THE INVENTION

The present invention employs sound waves (rather than light or other electromagnetic radiative sources), as signals for electronically controlling a device. The use of sound waves is necessary because the speed of sound is significantly slower than the speed of light; thus, the change in time for sound waves to travel from the emitter to the detector may be measured accurately enough to be used to precisely control electronic devices.

Motion detection and ranging systems are not uncommon in present technology. Early ranging systems were used in cameras to determine absolute distances from other objects. This overall process of motion detection and determining the position of objects has become more refined with various technological improvements.

Though many different systems are currently available for the control of electronic devices through remote means, many problems and inconveniences exist with these systems. The state of the art includes several apparati which rely on determining either the absolute time required for a signal to travel from an emitter to a detector (or detectors) or the absolute distance between the emitter and its respective detector(s). Several of these systems also require a minimum of more than one emitter-detector pair in order to control electronic devices. Furthermore, many of the controlling devices must be operated in contact with a surface in order for the sound waves to properly scatter. Also, several controlling devices exist that require the use of complex physical hand gesturing systems in order to activate the devices. In addition, many of the detectors incorporated into electronic controlling devices are partially photosensitive and thus require signals not only involving sonic waves but also involving infrared radiation from light source emitters. Other known devices require constant cord connection, rendering the control of a mouse or other devices impractical and inconvenient. Furthermore, in many devices, the emitter and the detector must be connected to the same object or be part of the same unit.

The remote control device described herein addresses the above-mentioned problems which arise in the prior art, and also provides other additional functions. The present invention has numerous uses associated with moving cursors on a computer screen. Examples of this use include, but are not limited to, the following: assistance for the disabled (since the remote device's adjustable sensitivity level allows for any part of a disabled person's body to provide control of a cursor); personal computer use; computer use as part of a business, educational, or industrial multi-media presentation; and internet use with a computer, adapted television, or any other device.

The present invention may also be used in order to position and/or control objects other than cursors on a computer screen. Examples of these include, but are not limited to, the following: remote control and/or positioning of objects in industry (especially objects in dangerous or harmful working environments where radioactivity, high temperatures, or toxic chemicals may be present); remote control of toys; remote control of household objects (vacuum cleaners, lawn mowers, etc.); remote-controlled movement of hospital beds and powered wheel chairs; camera adjustment while filming; and remote prevention of cars, subway trains, and regular trains from approaching each other too fast.

SUMMARY OF THE INVENTION

The present invention uses the change in time required for sound waves to travel from emitter(s) to detector(s) in order to control electronic devices. The time needed for sound waves from an emitter to reach a detector depends on the distance that the emitter is from the detector. The present invention uses a system which measures the time between emission and detection of two or more successive sound pulses or sound waves. The change in time for sound waves to travel the distance from the emitter to the detector or detectors is determined and then used for controlling electronic devices. The sound waves are produced by a sound generator, and the detector is designed specifically for the detection of sound waves. The emitter is constructed to produce two or more successive sound pulses or sound waves.

Several different types of sound waves may be employed in the present invention. Pulsed waves at a single frequency or pulsed waves at varying frequencies may be used. In addition, continuous sound waves that remain at a single frequency or continuous sound waves that vary in frequency may also be used.

A definite, or a standard, time interval will be determined between two or more successive sound pulses or sound waves. The time between successive sound pulses or sound waves received by the detector will be this definite or standard time interval as long as the distance between emitter and detector is not changed. However, if the emitter-to-detector distance is changing, the measured time between the detection of the successive pulses or waves will differ from the definite or standard time interval. Electronics enable the detector to compare the measured time between the detections of successive pulses or waves to the standard time interval. The difference between the measured time and the definite or standard time interval may then be used to calculate the changing distance between the emitter and the detector.

There are at least three operational setup possibilities for the present device: the detector may be stationary, and the change in distance is produced by the motion of the emitter; the emitter may be stationary, and the change in distance is produced by the motion of the detector; and neither the emitter nor the detector is stationary, and the change in distance is produced by the motion of one relative to the motion of the other. In any of these three cases, the present invention uses the change in distance produced by the relative motion of the emitter and/or the detector to control electronic devices.

The first example of the present remote control device employs a moving emitter, a stationary detector, and successive sound pulses, and this example facilitates the control of the motion of a cursor across a computer screen.

However, the applications of this invention are not limited to this specific example.

It is also possible for the process described herein to detect motion in more than one dimension by using multiple emitters and/or detectors. For example, using two emitters and/or detectors allows for two-dimensional motion to be imparted to a cursor across a computer screen while using three emitters and/or detectors allows for cursor motion that appears to be three-dimensional on a computer screen.

DETAILED DESCRIPTION OF THE PREFERRED EMBODIMENTS

Figure 1A:
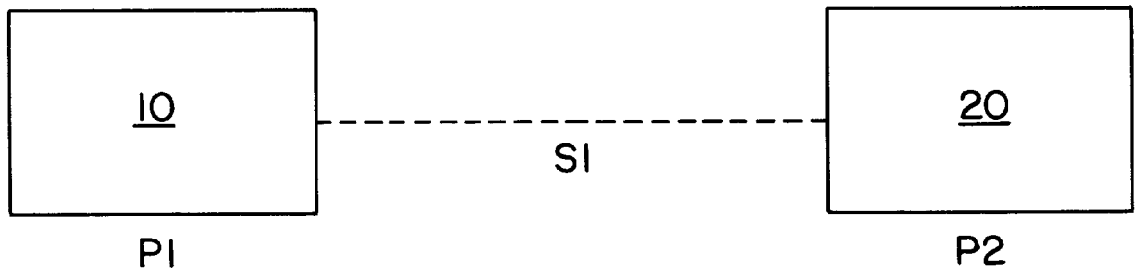
FIGS. 1A and 1B are block diagrams illustrating the method of the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

Preferred embodiments of an apparatus which utilizes sound waves in order to directly control electronic devices according to the present invention are described herein. One embodiment of the invention entails the control of the motion of a cursor across a computer screen. The remote control device, in this case, is handheld with its power source being batteries, solar power, etc. Thus, the remote control device either is connected by wires to other equipment or is self-contained. The emitter may be part of the remote control device with one or more detectors connected to the mouse port of a computer. For instance, in one embodiment, the use of two or more detectors (with at least one detector located at a distance generally horizontal from the area where the remote control device will be operated and at least one detector located at a distance generally vertical from this area) would allow for control of the cursor's motion in two dimensions. In fact, in this embodiment, the two or more detectors may be located in any two or more directions relative to the operating location of the remote control device including those directions that are at right angles to each other (as in the above-mentioned case) and those directions that are not at right angles to each other.

In an alternative embodiment, the two or more detectors may be located in many directions relative to the operating location of the remote control device including those directions that are at right angles to each other (as in the above-mentioned case) and many directions that are not at right angles to each other. The use of three or more detectors located at three or more different directions relative to the operating location of the remote control device may allow for control of a cursor so that the cursor appears to move in three dimensions relative to renderings of three dimensional objects or scenarios on a two-dimensional computer screen.

The remote control device, in this case, acts as an emitter and emits sound pulses in a regular manner so that a definite or standard time interval exists between successive sound pulses when the emitter and detector are first turned on or calibrated. The use of ultrasonic sound waves is preferred so that other sounds used for human communication, music, etc., do not create unwanted interference. However, the present invention is not restricted to the use of ultrasonic sound waves. Audible sound waves and low frequency sound waves may also be used.

The detector is calibrated either during use, at the factory, or as part of an initialization process. This calibration process allows for the standard time interval between sound bursts to be established while the remote control device described herein is stationary.

The detector is then able to determine the actual time between the sound bursts as the sound bursts reach the detector. The difference between these time values and the calibrated time values indicates the extent to which the remote control device has been moved during the time between two successive bursts of sound. This time difference can ultimately be used to control an electronic device. In the control of a cursor, the detected time differences are converted into electronic signals so that as the remote control device is moved horizontally, vertically, or at any angle through any curved or straight path in a plane, the cursor on the screen will duplicate this motion. The relevant plane depends on both the location and the calibration of the detectors. If desired, motion of the remote control device that is perpendicular to the relevant plane may produce no motion of the cursor on the screen. Thus, this perpendicular movement could be used to control other aspects of the computer or other electronic devices. Also, at times it may be desirable to move the remote control device without having the cursor on the screen move. This is easily accomplished by stopping the emitting of sound bursts from the remote control device described in the present invention.

Figure 1B:
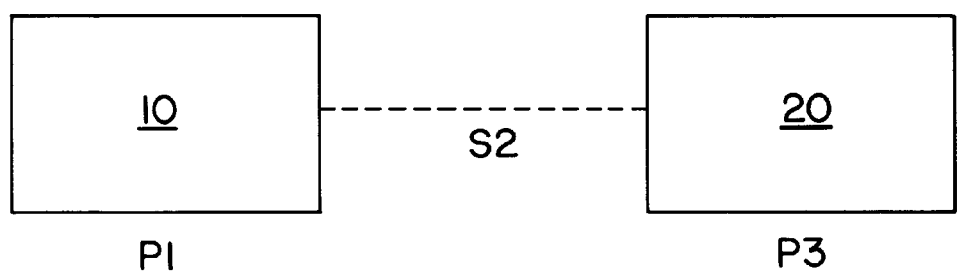

One exemplary method of practicing the present invention is shown in FIGS. 1A and 1B. As shown in FIG. 1A, a first sound emitter 10 is located at position P1 and a first sound detector 20 is located at P2. A sound wave S1 is transmitted from sound emitter 10 and is detected by sound detector 20. In the particular illustrated embodiment, first sound detector 20 has been moved to position P3. After a passage of a certain time interval, a second sound wave S2 is emitted from sound emitter 10 and is detected by sound detector 20 at position P3. The difference in time between the detection of sound wave S1 and sound wave S2 is then determined and is compared with the standard interval at which the sound emitter 10 regularly emits sound waves. This information is then utilized to supply control signals to an electronic device.

An alternative embodiment that further exemplifies the process described in the present invention involves the charging of a capacitor or other electrical device. A sound emitter may emit a sound wave or sound pulse that is received by a detector. The detector then signals a capacitor to begin charging. A subsequent sound wave or pulse may be emitted after a definite or standard time interval and then received by the detector. The detector subsequently signals the capacitor to stop charging. The total charge or voltage on the capacitor would then be directly related to the distance between the emitter and the detector. Therefore, if the emitter, the detector, or both the emitter and the detector changed position and the sequence of sound wave emission and detection occurred in order to charge up the capacitor, the resulting charge or voltage on the capacitor would differ from the charge on the capacitor after the standard time interval and hence provide information about the change in distance between the emitter and the detector.

An additional embodiment of the present invention may involve the standard placement of sound emitters on automobiles and sound wave detectors on devices for law enforcement officers. Through the emission of sound waves by standard emitters placed on each car and the detection of these sound waves by detectors carried by law enforcement officers, a system may be set up that acts as a motion and speed detection system and further enables law enforcement officers to enforce speed limits.

A working model demonstrating the feasibility of one embodiment of this invention has been constructed using commercially available components. An ultrasonic pulse generator (or emitter) was connected to a first computer equipped with software capable of producing ultrasonic pulses. Any ultrasonic pulse emitter could be used to generate such pulses. One example of an emitter that could be used is a SONIC RANGER, Vernier Ultrasonic Motion Detector Model U-MD, manufactured by Vernier Software in Portland, Oregon. The software used is MACMOTION also sold by Vernier Software in Portland, Oreg.

In one embodiment, ultrasonic pulses may be produced at regular intervals, separated by a calibrated length of time. In this particular embodiment, the calibrated length of time (or standard time interval) was about 0.025 seconds. The pulsed ultrasonic waves produced at regular intervals were then detected by an ultrasonic pulse detector (in one case, a second SONIC RANGER). SONIC RANGERS may act as both an emitter and a detector of ultrasonic pulses. The first SONIC RANGER in this example was used only to emit ultrasonic pulses, while the second SONIC RANGER was used only to detect pulses.

When the second SONIC RANGER detected the pulses emitted by the first SONIC RANGER, the second SONIC RANGER was connected to appropriate electronic circuitry to generate an electronic signal. This electronic signal was then fed into the input of a processing unit. The processing unit used in this particular example was a Motorola Board model #M68HC11EVBU manufactured by Motorola Inc. of Phoenix, Ariz. A motion detecting program written by the presnt inventor was utilized on this processing unit. A copy of this computer program is attached as Appendix A. The motion detecting program on the processing unit began timing the moment at which the first ultrasonic pulse was detected and the electronic signal was received by the processing unit.

Since the first SONIC RANGER was already constructed to emit ultrasonic pulses at regular intervals, a second ultrasonic pulse was soon detected by the second SONIC RANGER, and a second electronic signal was sent to the processing unit. When the second signal was received by the processing unit, the computer program written by the inventor located in the processing unit enabled the time between these two signals to be stored. The program then compared this stored time to the standard time interval between the emission of successive pulses by the first SONIC RANGER.

In this specific example, the detector was located to the right of the emitter. Thus, the computer program was written so that if the stored time was less than the standard interval, a RT signal (right signal) was generated by the processing unit to an output pin. If the stored time was greater than the known time, a LF signal (left signal) was generated and sent to the output pin. If the stored time did not differ significantly from the known time, no signal was generated or output.

A connecting cable from a second computer was used which connected into the keyboard/mouse port of this second computer. The second computer used in this specific embodiment was a Macintosh Classic Computer Model #M0420 manufactured by Apple Computer, Inc. of Cupertino, Calif. The signal that the processing unit produced was fed into a second electronic circuit which fed its signal into the second computer using this cable. The RT signal produced by the processing unit caused the second circuit to mimic the signal produced by the mouse when it was rolling right, while the LF signal caused the second circuit to mimic the signal produced by the mouse when it was rolling left. Thus, each RT signal received by the second computer resulted in the movement of the cursor on the second computer screen one position to the right, while each LF signal resulted in the movement of the cursor on the second computer screen one position to the left.

As long as the first SONIC RANGER was moving to the right, the time between successive ultrasonic pulses detected by the second SONIC RANGER was less than the calibrated time, and RT pulses were generated and sent into the mouse port of the second computer. When the first SONIC RANGER was moving to the left, LF pulses were sent to the mouse port, and when the first generator was not moving, no pulses were sent. The motion of the first SONIC RANGER right and left resulted in the corresponding right and left motion of the cursor on the second computer screen.

This system required no synchronization between the emission of sound waves by the first SONIC RANGER and the timing or detection by the second SONIC RANGER. Unlike prior art systems, there was no need to calculate the distance between the first and second SONIC RANGERS. Nevertheless, as long as the first generator was emitting pulses, its right and left motion controlled the right and left motion of the cursor on the screen of the second computer.

The construction of this arrangement from commercially available components allows for many variations. The working prototype was constructed using a commercially available Vernier Ultrasonic Motion Detector Model U-MD (manufactured by Vernier Software in Portland, Oreg.) that allowed both emission and detection of sound waves. A number of similar units that are also capable of both emitting and detecting sound waves are available commercially including Pasco Scientific SONIC RANGER Models ME 9411, 9381A, and 9412 (manufactured by Pasco Scientific in Roseville, Calif.), Polaroid Ultrasonic Ranging Systems 6500 series ranging modules (manufactured by Polaroid Corporation in Cambridge, Mass.), and others. However, systems may also be set up utilizing units that only emit sound as emitters and units that only detect sound as detectors.

The processing unit (Motorola Board model #M68HC11EVBU) was used in this prototype in order to provide the electrical signal logic. However, this signal logic could be provided in a variety of ways including the use of one or more specially designed integrated circuit (IC) chips or a simple combination of 555 timing chips and logic gates.

The prototype involved only one emitter and one detector, and the cursor on the second computer screen was moved only in the horizontal direction. The addition of more emitters and/or more detectors may improve the accuracy and/or make the cursor on the second computer screen move in two dimensions or appear to move in three dimensions on three-dimensional representations. For example, if a single emitter is being moved, a simple extension of using two detectors (one located horizontally and one located vertically) would easily allow the motion of the emitter in any combination of horizontal and vertical directions to be detected and subsequently translated into the corresponding combination of vertical and horizontal movements of the cursor on the second computer screen. The addition of a third detector would allow the cursor to appear to be moved forward and backward. Obviously, a cursor on a two-dimensional computer screen cannot move in the third dimension. Yet, if a scene depicting a three-dimensional situation were present on the screen, the cursor could thus appear to be moving forward and backward within this two-dimensional representation of a three-dimensional surrounding. Thus, the addition of more detectors and/or emitters is possible in order to improve the accuracy and the versatility of the device.

In this prototype, the emitter of ultrasonic pulses was being moved, and its motion was detected by a stationary sound detector.

However, it is also possible to have the emitter stationary and the motion of a moving detector determined by this stationary emitter. In fact, both the emitter and the detector may be moving, and the relative motion between the two would be detected and subsequently used in controlling devices.

In the working prototype, the time between the emitted pulses was known while the detector was being designed. However, this is not necessary. For example, if the time between the emitted pulses is not known, a brief calibration sequence may be performed while both the emitter and the detector are stationary relative to each other. This calibrated frequency value may then be used when motion detection is desired.

In the working model, no adjustments were made for small effects such as temperature, wind speed, and the like. Since the absolute distance between emitter and detector was not being determined, these small effects were not of importance. However, corrections for such effects may be incorporated into commercial designs of the present invention in order to improve the accuracy of the motion detection.

In the prototype, the detector's electronic circuit only detected whether or not the emitter had significant velocity toward or away from the detector. However, the detector circuit could be further refined to detect the speed of the motion.

This prototype used ultrasonic pulses; however, ultrasonic, audible, and low frequency sound waves could be used. Furthermore, pulses of sound at a single frequency, pulses of sound at varying frequencies, continuous sounds at a single frequency, or continuous sounds at varying frequencies may be used.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for supplying control signals to an electronic device comprising the steps of:
   emitting a first sound wave from a sound emitter located at a first position;
   detecting said first sound wave by a sound detector located at a second position;
   changing the relative distance between said sound emitter and said sound detector by moving either of said sound emitter or said sound detector to a third position;
   emitting a second sound wave from said sound emitter after the passage of a standard time interval after emitting said first sound wave;
   detecting said second sound wave by said sound detector;
   determining the difference in time between said detecting of said first sound wave and said detecting of said second sound wave;
   arriving at a value by subtracting said difference in time from said standard time interval;
   using said value to generate control signals without the necessity for determining the absolute distance between said sound emitter and said sound detector or determining the absolute time required for said first and second sound waves to travel from said emitter to said detector; and
   supplying said control signals to an electronic device.

2. A method for supplying control signals to an electronic device according to claim 1 wherein said sound emitter emits said first and second sound waves in a regular manner so that said standard time interval between the emissions of said first and second sound waves remains constant.

3. A method for controlling a device according to claim 1 wherein said first and second sound waves are ultrasonic waves.

4. A method for controlling a device according to claim 1 wherein said first and second sound waves are audible sound waves.

5. A method for controlling a device according to claim 1 wherein said first and second sound waves are pulsed waves of sound.

6. A method for controlling a device according to claim 5 wherein said pulsed waves of sound are pulsed at a single frequency.

7. A method for controlling a device according to claim 5 wherein said pulsed waves of sound are pulsed at varying frequencies.

8. A method for controlling a device according to claim 1 wherein said first and second sound waves are continuous waves of sound.

9. A method for controlling a device according to claim 8 wherein said continuous waves of sound remain at a single frequency throughout their emission.

10. A method for controlling a device according to claim 8 wherein said continuous waves of sound change frequency throughout their being emitted.

11. A method for supplying control signals to an electronic device according to claim 1 wherein changing the relative distance between said sound emitter and said sound detector is achieved by moving said sound emitter to said third position and moving said sound detector to a fourth position either toward or away from each other.

12. A method for controlling a device according to claim 1 wherein said emitter and/or said detector employs a battery as a power source.

13. A method for controlling a device according to claim 1 wherein said emitter and/or said detector employs solar power as a power source.

14. A method for controlling a device according to claim 1 further comprising the use of three or more sound emitters and the use of three or more sound detectors.

15. A method for supplying control signals to an electronic device for generating control signals according to claim 1 further comprising the use of a second sound emitter to produce said second sound wave.

16. A method for supplying control signals to an electronic device for generating control signals according to claim 1 further comprising the use of a second sound detector to detect said second sound wave.

17. A method for supplying control signals to an electronic device for generating control signals according to claim 1 wherein said electronic device is a cursor on a computer screen.

18. A method for supplying control signals to an electronic device for generating control signals according to claim 1 further comprising the use of a second sound emitter to produce said second sound wave.

19. A method for controlling a device according to claim 17 wherein said movement of said cursor on said computer screen is either to the right, to the left, up, down, or diagonally on said screen.

20. A method for controlling a device according to claim 18 wherein both said sound emitter and said second sound emitter emit first and second sound waves in a regular manner so that a standard time interval is established between the emissions of said first and second sound waves.

* * * * *